R. H. BELL.
COLLAPSIBLE CAPSULE.
APPLICATION FILED SEPT. 20, 1910.

1,023,499.

Patented Apr. 16, 1912.

Witnesses:
Lillian Miatt
[signature]

Inventor:
Ralcy Husted Bell,
By his Attorney
Geo. W. Miatt

UNITED STATES PATENT OFFICE.

RALCY HUSTED BELL, OF NEW YORK, N. Y.

COLLAPSIBLE CAPSULE.

1,023,499.  Specification of Letters Patent.  Patented Apr. 16, 1912.

Application filed September 20, 1910. Serial No. 582,811.

*To all whom it may concern:*

Be it known that I, RALCY HUSTED BELL, a citizen of the United States, residing in the borough of Manhattan, city, county, and State of New York, have invented certain new and useful Improvements in Collapsible Capsules, of which the following is a specification.

The main object of my invention is to afford a compressible capsule which is adapted to discharge its contents in the form of a blast, spray, or stream,—a self-contained ejector in which fluid, semi-fluid or comminuted matter is hermetically sealed until desired for immediate use; and the invention consists essentially in a collapsible capsule in which are incorporated filaments which may be extracted to form holes for the discharge of the contents of the capsule substantially as herein described and claimed specifically.

While applicable to an infinite variety of uses and purposes my capsule is designed more especially as a one dose or application device to be discarded after use, although it may be made to contain material for a plurality of doses or applications if desired,—the distinguishing feature of novelty being the use of embedded filaments which may be extracted to form apertures for the discharge of the contents of the capsule.

Figure 1:
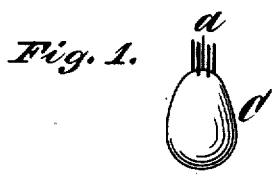
Figure 2:
Figure 3:
Figure 5:
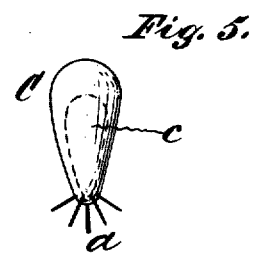
Figure 4:

In the accompanying drawings: Figure 1 is an elevation of a capsule of ovoidal form made in accordance with my invention; Fig. 2, is an end view; Fig. 3, a central longitudinal section; Fig. 4, a view illustrating a use of the device, Fig. 5, is an elevation of the capsule having the discharge end contracted into the form of a nozzle.

The capsule C, is made of gelatin or any other suitable material possessing the requisite degree of flexibility, and has a cavity $c$, in which is contained the substance to be dispensed or applied. It is also provided, preferably at its narrow end, with embedded filaments $a$, which extend into the cavity $c$, and are adapted to be readily pulled out or extracted to form apertures or passages through which the contents of the capsule may be forcibly ejected by the compression of the sides of the capsule between the thumb and finger as indicated in Fig. 4, for instance, or by any other convenient application of force.

The filaments $a$, may consist of suitable lengths of thread, cord, bristles, wire or any other material adapted to be wholly withdrawn from the capsule for the purpose designated; and they may be of any desired size or shape in cross section as may be found most expedient.

Among the various uses to which my ejector-capsule is adapted may be mentioned the direct local application of antiseptic, hygienic, medicinal preparations; the treatment of colds, grippe, catarrh, tonsilitis, sore throat and innumerable other diseases or morbid affections; the prevention of contagious diseases; disinfection; and so on, *ad libitum.*

Prepared as a single dose or application device it may be immediately discarded or destroyed after use, thus preventing possibility of contagion, infection, &c.

What I claim as my invention and desire to secure by Letters Patent, is:

A receptacle for a medicament formed of compressible material and having spray outlets normally closed by removable filaments.

RALCY HUSTED BELL.

Witnesses:
  GEO. WM. MIATT,
  LILLIA MIATT.